UNITED STATES PATENT OFFICE.

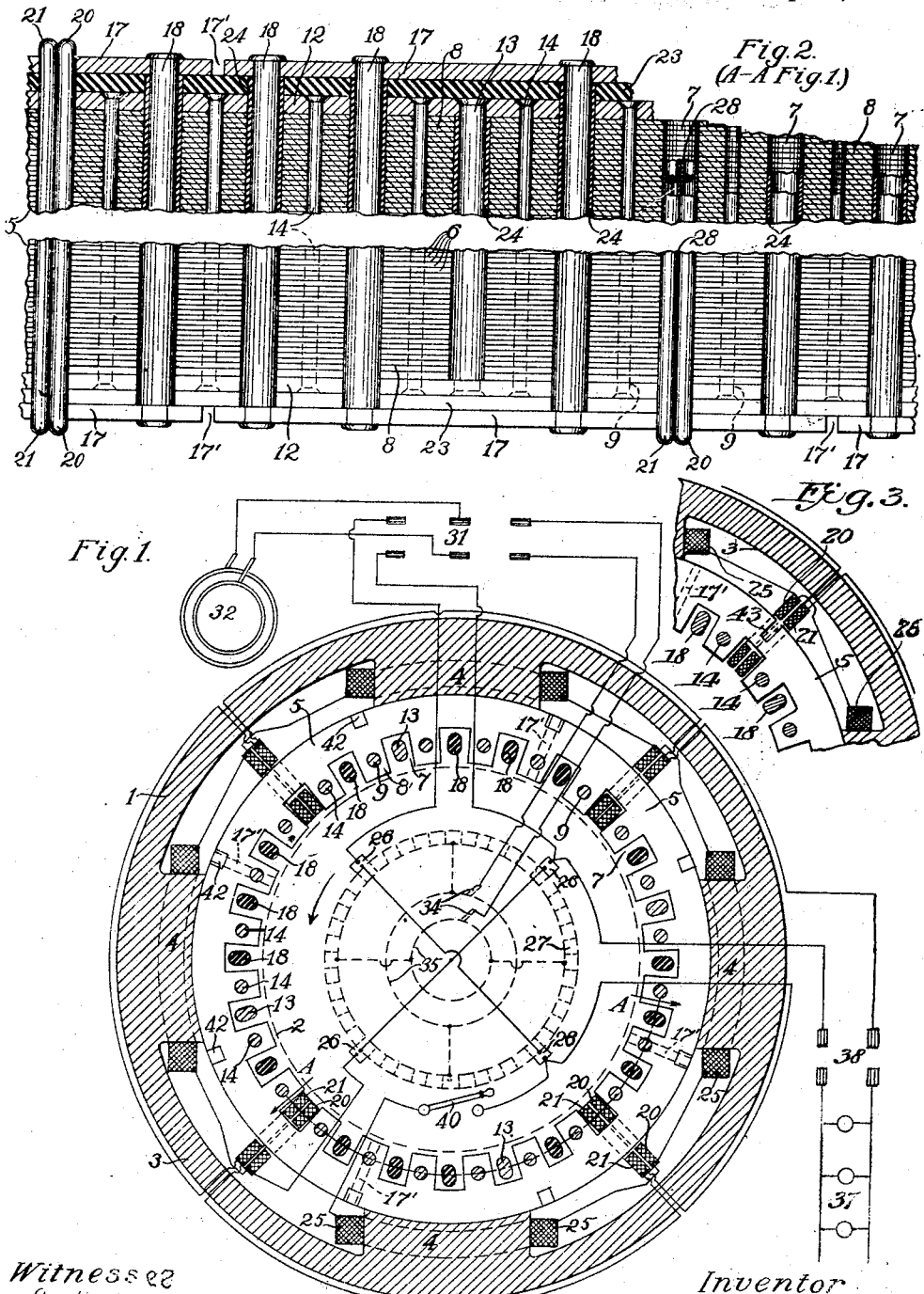

SAMUEL H. MARTIN, OF CHICAGO, ILLINOIS.

DYNAMO-ELECTRIC MACHINE.

1,177,788.  Specification of Letters Patent.  Patented Apr. 4, 1916.

Application filed January 2, 1915. Serial No. 233.

*To all whom it may concern:*

Be it known that I, SAMUEL H. MARTIN, a citizen of the United States of America, and a resident of Chicago, county of Cook, and State of Illinois, have invented certain new and useful Improvements in Dynamo-Electric Machines, of which the following is a specification.

This invention relates to improvements in dynamo-electric machines, and more particularly to machines of this class adapted for motor service, and also for the conversion of single or polyphase current into direct current and vice versa.

The main objects of the invention are to provide an improved construction and arrangement of field members and electric circuits for machines of the character described; to provide improved means for starting machines made in accordance with this invention; to provide and arrange regulating conductors both in the field and line circuits and also independently thereof for better control of speed; to provide an improved form of magnetic screen adapted to house and support the conductors of a squirrel cage and having electric circuits disposed thereon adapted to more effectually control the distribution and density of field flux in starting and when operating under various conditions, and especially to suppress line surges and prevent hunting; to provide an improved form of squirrel cage structure adapted to react by repulsion upon the armature; to provide a machine adapted to start as a repulsion motor and to operate as a synchronous motor, and also having induction motor characteristics; to provide means for changing the motor circuit connections by a single switching operation from starting to running conditions, as for switching the motor current to the commutator in starting and to the collector rings for running; and to construct a machine of the character specified so as to permit of its being operated either as a motor or as a rotary converter.

An illustrative embodiment of this invention is shown in the accompanying drawings, in which—

Figure 1 is a diagram showing circuit connections and a central cross section of a single phase alternating current machine, taken through the poles, in which view the collector rings, commutator and armature are shown by dotted lines. Fig. 2 is a fragmentary view of the inner side of the combined screen ring and squirrel cage of Fig. 1, developed in a plane for convenience in illustrating the relation of the various parts, the upper part of the view being in section along the line A—A of Fig. 1. Fig. 3 is a fragmentary sectional view similar to a part of Fig. 1, but showing a modified outside slotting of the screen member between the poles.

In the construction shown in the drawings, the machine comprises a pair of relatively movable members, one of which is adapted and arranged to serve as a field member 1 and the other as an armature 2. Said field member comprises an annular magnetic yoke 3 with projections or poles 4, and has thereon an annular member 5 in the form of a magnetic screen adapted and arranged to house and support squirrel cage members hereinafter described, said screen being disposed between said armature and poles and being rigidly fixed to and carried by said poles. The said screen 5 comprises a plurality of iron laminations 6 disposed radially side by side and clamped together. Said screen is provided with an annular series of slots 7 and teeth 8 alternately disposed in the side adjacent to the armature, said slots being uniformly distributed and the teeth being perforated at 9.

Squirrel cage members, referred to above, are arranged concentrically in two substantially independent and dissimilar groups, one of which comprises a continuous annular squirrel cage, and the other a segmental squirrel cage having its segments arranged in series and preferably with the ring sectors at each end in the same plane respectively and spaced apart circumferentially.

The continuous squirrel cage comprises a pair of conductor rings or plates 12 disposed on opposite sides of the screen 5, and a series of bars 13 and 14 disposed in certain of said slots 7 and in the perforations 9 respectively, said bars preferably being adapted and arranged for clamping said rings upon the screen and thereby holding the squirrel cage and screen together in a unitary and rigid manner. The bars 13 are preferably disposed in slots adjacent to the trailing edges of the poles 4 respectively.

The segmental or multiple squirrel cage comprises a pair of segmental rings or plates substantially like those of the continuous squirrel cage, except that each ring comprises a plurality of equal segments 17 insulated from one another and corresponding in number with the poles 4, said segments being insulated from one another at the points 17'. The segments on one side of the screen are arranged each opposite a segment on the other side, and corresponding opposite segments are connected by bars 18 adapted to clamp the segments in place and disposed in certain of the slots 7, namely, those not occupied by the bars 13, or the coils 20 and 21 hereinafter described midway between the poles 4. The segments of the multiple squirrel cage are all displaced angularly, somewhat, from registry with their respective poles, preferably about 360/4P degrees in the direction of rotation, broaden the effective area of the poles. The bars 13 and 18 are preferably extra heavy as compared with the bars 14. Insulation rings or plates 23 separate the adjacent end rings, and insulation 24 surrounds the bars 13 and 18.

Each polar member or division of the segmental squirrel cage constitutes and serves as an amortisseur grid, a squirrel cage and a repulsion member, and because of its angular displacement respecting the main poles 4 operates most effectually as a motive member especially in starting. The continuous squirrel cage serves mainly as an induction secondary and as a damper or stabilizer.

In order to provide for controlling the field flux automatically the coils 20 and 21 are arranged preferably midway between the poles 4 on the ring 5 in the middle slots 7. Said coils are ring wound and each pair may be placed side by side in the same slot as shown, though this precise arrangement of coils respecting the slots is merely illustrative. The coils 20 are essentially shunt windings, as are the main field coils 25, and said coils 20 and 25 are preferably connected in series with one another across the direct current brushes 26 on the commutator 27. Said coils 20 are connected to oppose magnetic leakage from the main poles through the screen. By this means the effect on the poles 4 of the continuous magnetic path 5 of the induction motor stator is substantially neutralized and leakage prevented. The coils 21 are essentially series windings and are connected in series with the direct current line circuit, so as to further oppose magnetic leakage between the main poles. Moreover, the said coils 21 tend to strengthen the main poles and hold the neutral or commutation point at a fixed position. They also serve to magnetize the intermediate portions of the ring 5 adjacent to the edges of the poles 4 and thereby supplement and broaden the effective area of the poles. The direct current voltage is thereby maintained nearly constant for all degrees of load. The coils 20 and 21 are formed of magnet wire, and are protected by insulation 28.

Motor current of suitable phase, voltage and frequency is fed to the machine through a double-throw switch 31 connected in a circuit leading to a suitable source 32. Said switch 31 is arranged to connect the motor current either to the brushes 26 and commutator 27, or to the brushes 34 and slip rings 35. Direct current may be supplied for any desired purpose as to lamps 37 on a circuit having a line switch 38.

When a machine embodying the features of this invention is to be used as a converter to furnish direct current, it is necessary to provide means for controlling the polarity. In order to provide for such control, a switch 40 is preferably connected in the shunt field circuit. If, upon starting the machine, the voltage across the brushes 26 is not in the right direction, said switch 40 may be opened and closed, which operation may be repeated until the desired polarity is produced. The same result may be accomplished by opening the motor switch 31 but with less efficiency and convenience. When the machine is to be used for motor service only the switch 40 may be omitted as the matter of field polarity is material only when direct current is to be taken from the machine.

Slots 42 are preferably provided in the magnetic ring 5 in the side opposite from the slot 7 and adjacent to the edges of the poles 4. The said slots 42 serve to restrict or choke the leakage path of the field flux and thereby assist in controlling the field. With the slots 42 arranged as stated, they serve especially when the machine is lightly loaded, to concentrate the field strength immediately under the poles 4 and thereby help to hold the neutral or commutation point in a fixed or nearly fixed position, which is important when the machine is to be used as a converter. When the direct current line is loaded the series coils 21 energize the ring 5 between the adjacent slots 42 respectively so as virtually to strengthen the field. When the machine is to be used solely as a motor the coils 21 are omitted, and a single slot 43 shown on Fig. 3, may be provided midway between each pair of poles 4 in place of the slots 42. In this instance the slots 43 restrict the magnetic leakage and the coils 20 neutralize and oppose leakage. Said slots 42 and 43 serve the same or like purpose in polyphase machines.

The operation of the machine is as follows: In starting, the motor switch 31 is thrown to the left, whereby alternating current is fed to the armature through the commutator. The machine starts mainly as an inverted repulsion motor, induction motor features assisting. When the machine has come up to synchronous speed, the said switch is thrown over to its running position, whereby the motor current is fed through the slip rings. The machine runs normally as a synchronous converter or motor, and in case of overload is assisted by the induction motor members. The supply of direct current from the machine is controlled by the switch 38.

This invention is an improvement over the devices of my copending applications, Serial No. 716,407 filed August 22, 1912, and Serial No. 771,172 filed June 2, 1913, and distinguishes therefrom mainly in the multiple and segmental character of the induction secondary or squirrel cage, and in the angular displacement thereof, or of certain of its parts, with respect to the physical poles of the machine, and in the provision of reluctance apertures or slots disposed transversely in the outer side of the screen to diminish leakage of flux through said screen between the polar projections 4.

Although but one specific embodiment of this invention has been herein shown and described, it will be understood that numerous details of the construction shown may be altered or omitted without departing from the spirit of this invention as defined by the following claims.

I claim:—

1. In a dynamo-electric machine, a pair of relatively movable members, one of which comprises a plurality of annular squirrel cage members concentrically disposed, one of said squirrel cage members being segmental in form.

2. A dynamo-electric machine, comprising a field member having polar projections thereon, a magnetic ring embraced by said polar projections, a relatively movable member coaxially disposed with respect to said field member, said magnetic ring having an annular squirrel cage structure disposed adjacent to said movable member, and also a segmental squirrel cage structure insulated from and independent of the first mentioned squirrel cage structure, and also disposed adjacent to said movable member.

3. A dynamo-electric machine, comprising a field member having polar projections thereon, a magnetic ring embraced by polar projections, a relatively movable member coaxially disposed with respect to said field member, said magnetic ring having an annular squirrel cage structure disposed adjacent to said movable member, and also a segmental squirrel cage structure insulated from and independent of the first mentioned squirrel cage structure, and also disposed adjacent to said movable member, the segments of said segmental structure being equal in number to said polar projections and adjacent thereto but angularly displaced therefrom.

4. In a device of the class described, a structure comprising a magnetic ring, a pair of conductor rings disposed on opposite sides of said magnetic ring, conductor bars spaced apart around said magnetic ring and connecting said conductor rings, a pair of segmental conductor rings also disposed on opposite sides of said magnetic ring, the sectors whereof are each insulated, and the sectors on one side of said magnetic ring being disposed to register with corresponding sectors on the opposite side, and another series of conductor bars spaced apart around said magnetic ring and connecting corresponding segments on opposite sides of said magnetic ring, there being a plurality of the last mentioned bars for each pair of said sectors.

5. A dynamo-electric machine comprising a field member having polar projections thereon, a relatively movable member coaxially disposed with respect to said field member, said polar projections being disposed to face toward said movable member, a magnetic ring adapted to serve as a screen disposed between said polar projections and movable member and carried rigidly by said polar projections, said magnetic ring having an annular squirrel cage structure carried thereby and disposed adjacent to said movable member, and a series of independent closed circuit members corresponding in relative position to said polar projections respectively.

6. In a dynamo-electric machine, a field ring having polar projections thereon in combination with a structure comprising a magnetic ring carried rigidly by said polar projections, a pair of conductor rings disposed on opposite sides of said magnetic ring, conductor bars spaced apart around said magnetic ring and connecting said conductor rings, and a series of closed circuit conductor members disposed upon and carried by said magnetic ring adjacent to the said polar projections respectively, and displaced angularly therefrom in the same direction around said magnetic ring.

7. In a dynamo-electric machine, a yoke member having inwardly facing polar projections with shunt field windings thereon, an armature arranged to rotate within the said polar projections, a continuous magnetic ring disposed between said polar projections and said armature and embraced rigidly by said polar projections, an annular squirrel cage carried by said magnetic ring, and having induction members arranged in substantially uniform spaced relation around its inner periphery, said armature having a commutator and slip rings, brushes for said commutator and slip rings respectively, and ring wound series windings disposed on said magnetic ring between said polar projections.

8. In a dynamo-electric machine, a yoke member having inwardly facing polar projections with shunt field windings thereon, an armature arranged to rotate within the said polar projections, a continuous magnetic ring disposed between said polar projections and said armature and embraced rigidly by said polar projections, an annular squirrel cage carried by said magnetic ring, said armature having a commutator and slip rings, brushes for said commutator and slip rings respectively, and both shunt and series ring wound coils disposed on said magnetic ring between said polar projections.

9. A dynamo-electric machine comprising a field yoke having polar projections thereon, a relatively movable member coaxially disposed with respect to said field yoke, said polar projections being disposed to face toward said movable member, a magnetic ring disposed between said polar projections and movable member and carried rigidly by said polar projections, a continuous annular squirrel cage carried by said ring adjacent to said movable member, said squirrel cage having a series of relatively small conductor bars distributed around said squirrel cage and relatively large bars disposed adjacent to the trailing edges of said polar projections respectively.

10. A dynamo-electric machine comprising a field member having polar projections thereon, a relatively movable member coaxially disposed with respect to said field member, said polar projections being arranged to face toward said movable member, and a magnetic ring disposed between said polar projections and movable member and carried rigidly by said polar projections, said magnetic ring being separated from said movable member by a suitable air gap, and also being formed and arranged on the side facing said movable member to carry conductors and the opposite side being slotted transversely to restrict the magnetic path between said polar projections.

11. A dynamo-electric machine comprising a field yoke having polar projections thereon, a relatively movable member coaxially disposed with respect to said field yoke, said polar projections being arranged to face toward said movable member, a magnetic ring disposed between said polar projections and movable member and carried rigidly by said polar projections, and a ring-wound coil on said magnetic ring between each pair of adjacent polar projections, said ring being slotted transversely adjacent to the edges of said polar projections to concentrate the flux from said polar projections and restrict magnetic leakage, and said coil being series connected and arranged to strengthen and broaden the effective pole area when a direct current load is thrown upon the machine.

12. A dynamo-electric converter comprising a stationary yoke having polar projections thereon, a rotary armature disposed coaxially with respect to said yoke, said polar projections being disposed to face toward said armature, a magnetic ring disposed between said polar projections and armature and carried rigidly by said polar projections, said ring having squirrel cage members disposed about its inner surface adjacent to said armature and having transverse slots disposed adjacent to the edges of said polar projections adapted to limit spreading of the magnetic flux from said polar projections, and ring wound coils disposed on said ring between said polar projections, said coils being connected in series to the direct current side of the armature and arranged to supplement and broaden the effective area of the poles.

Signed at Chicago this 31st day of Dec., 1914.

SAMUEL H. MARTIN.

Witnesses:
 FRED M. DAVIS,
 WILLIAM E. HANN.

It is hereby certified that in Letters Patent No. 1,177,788, granted April 4, 1916, upon the application of Samuel H. Martin, of Chicago, Illinois, for an improvement in "Dynamo-Electric Machines," an error appears in the printed specification requiring correction as follows: Page 2, strike out line 22 and insert the words and letter *P representing the number of poles. The;* and that the said Letters Patent should be read with this correction therein that the same may conform to the record of the case in the Patent Office.

Signed and sealed this 2d day of May, A. D., 1916.

[SEAL.]

R. F. WHITEHEAD,
*Acting Commissioner of Patents.*

Cl. 171—123.